(12) United States Patent
Son et al.

(10) Patent No.: US 7,867,582 B2
(45) Date of Patent: *Jan. 11, 2011

(54) LIQUID CRYSTAL COMPOSITION AND LIQUID CRYSTAL DISPLAY HAVING SAME

(75) Inventors: Jong-Ho Son, Seou (KR); Fusayuki Takeshita, Seoul (KR); Jae-Jin Lyu, Yongin-si (KR); Keun-Chan Oh, Suwon-si (KR); Yong-Kuk Yun, Suwon-si (KR); Hyun Wuk Kim, Yongin-si (KR); Jang-Hyun Kim, Seoul (KR); Min-Goo Seok, Yongin-si (KR); Sik-Young Jo, Chungcheongnam-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/576,213

(22) Filed: Oct. 8, 2009

(65) Prior Publication Data

US 2010/0025631 A1    Feb. 4, 2010

Related U.S. Application Data

(63) Continuation of application No. 11/924,497, filed on Oct. 25, 2007, now Pat. No. 7,618,689.

(30) Foreign Application Priority Data

Dec. 11, 2006  (KR)  ................. 10-2006-0125423

(51) Int. Cl.
*C09K 19/34* (2006.01)
*C09K 19/32* (2006.01)
*C09K 19/30* (2006.01)

(52) U.S. Cl. .............. 428/1.1; 252/299.61; 252/299.62; 252/299.63

(58) Field of Classification Search .................. 428/1.1; 252/299.61, 299.62, 299.63
See application file for complete search history.

(56) References Cited

U.S. PATENT DOCUMENTS

| | | | | |
|---|---|---|---|---|
| 7,226,644 | B2 * | 6/2007 | Matsumoto et al. | 428/1.3 |
| 7,429,411 | B2 * | 9/2008 | Sugiura et al. | 428/1.1 |
| 7,498,067 | B2 * | 3/2009 | Fujita et al. | 428/1.1 |
| 7,618,689 | B2 * | 11/2009 | Son et al. | 428/1.1 |
| 2005/1013619 | * | 6/2005 | Kataoka | 428/1.1 |
| 2006/0163536 | A1 * | 7/2006 | Matsumoto et al. | 252/299.61 |
| 2007/0221881 | A1 | 9/2007 | Fujita et al. | |
| 2007/0272897 | A1 | 11/2007 | Son et al. | |
| 2008/0138542 | A1 * | 6/2008 | Son et al. | 428/1.3 |

FOREIGN PATENT DOCUMENTS

| | | | |
|---|---|---|---|
| EP | 1491612 A | | 12/2004 |
| EP | 1640433 A | | 3/2006 |
| JP | 2005281560 | * | 10/2005 |
| JP | 2006037053 | * | 2/2006 |
| JP | 2006037054 | * | 2/2006 |
| JP | 2006124544 | * | 5/2006 |

* cited by examiner

*Primary Examiner*—Shean C Wu
(74) *Attorney, Agent, or Firm*—Innovation Counsel LLP

(57) ABSTRACT

A liquid crystal composition and a liquid crystal display including the liquid crystal composition that includes a first class containing a fluorine-containing liquid crystal compound represented by Formula I (n=1, 2, or 3), and a second class containing at least one neutral liquid crystal compound represented by Formulae III, IV, and V. In Formula I, $W_1$ and $W_2$ are each independently selected from the group consisting of —F, —$CF_3$, —$CF_2H$, —$OCF_3$, and —$OCF_2H$, the liquid crystal compounds represented by Formulae I, III, IV, and V have $R_1$, $R_2$, and $R_5$ to $R_{10}$ that are any one of a hydrogen atom, and an alkyl group, an alkoxy group, and an alkenyl group having 1 to 12 carbon atoms as terminal groups, and a first sub-class has a content of 6 wt % or less based on a total content of the first class and the second class, with the proviso that a liquid crystal compound of the first class having n=1 is the first sub-class and a liquid crystal compound of the first class having n=2 or 3 is a second sub-class.

18 Claims, 6 Drawing Sheets

LIQUID CRYSTAL COMPOSITION AND LIQUID CRYSTAL DISPLAY HAVING SAME

CROSS-REFERENCE TO RELATED APPLICATION

This application is a continuation application of U.S. patent application Ser. No. 11/924,497, filed Oct. 24, 2007, which claims priority to and the benefit of Korean Patent Application No. 10-2006-0125423 filed in the Korean Intellectual Property Office on Dec. 11, 2006, the entire contents of which are incorporated herein by reference.

BACKGROUND OF THE INVENTION

1. Field of the Invention

The present invention relates to a liquid crystal composition and a liquid crystal display including the same.

2. Description of the Related Art

Currently, the liquid crystal display (LCD) is one of the most extensively used flat panel displays. The liquid crystal display has two display panels in which field generating electrodes are formed, and a liquid crystal layer that is interposed between the panels. In the liquid crystal display, a voltage is applied to the field generating electrodes so as to generate an electric field, and then the alignment of liquid crystal molecules of the liquid crystal layer is determined by the electric field. Accordingly, the transmittance of light passing through the liquid crystal layer is controlled. In the liquid crystal display, it is very important that the liquid crystals obtain a desired image by controlling light transmittance. Particularly, in accordance with the wide range of uses, there is a need to assure that the liquid crystal exhibit various characteristics such as low voltage driving, high voltage holding ratio (VHR), wide viewing angle, wide operation temperature range, and high speed response. The liquid crystal composition contains various types of liquid crystal components mixed so as to satisfy the above-mentioned various characteristics.

However, in addition to the liquid crystal composition, a great amount of ion impurities are present in the liquid crystal layer. The ion impurities may reduce the voltage holding ratio (VHR) of the liquid crystal display, be laterally transported along an electric field formed in the liquid crystal layer and be concentrated at a predetermined portion such as at the boundary of a field generating electrode. The portion at which the ion impurities are concentrated may be observed as a residual image from the outside.

SUMMARY OF THE INVENTION

According to an exemplary embodiment of the present invention, a liquid crystal composition that maintains the voltage holding ratio and avoids residual images includes a first class containing a fluorine-containing liquid crystal compound represented by Formula I where (n=1, 2, or 3):

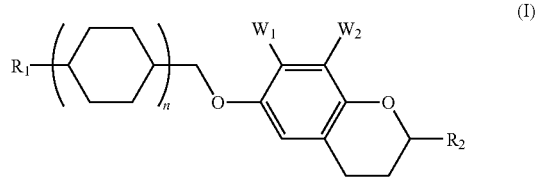

and a second class containing at least one neutral liquid crystal compound represented by Formulae III, IV, and V:

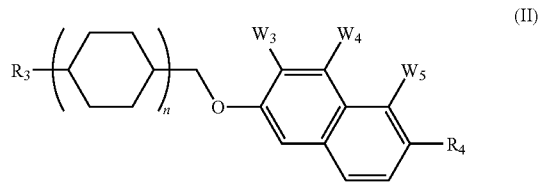

In Formula I, W1 and W2 are each independently selected from —F, —CF3, —CF2H, —OCF3, and —OCF2H, the liquid crystal compounds represented by Formulae I, III, IV, and V have R1, R2, and R5 to R10 that are any one of a hydrogen atom, and an alkyl group, an alkoxy group, and an alkenyl group having C1 to C12 as terminal groups, and a first sub-class has a content of about 6 wt % or less based on a total content of the first class and the second class, with the proviso that a liquid crystal compound of the first class having n=1 is the first sub-class and a liquid crystal compound of the first class having n=2 or 3 is a second sub-class.

In the liquid crystal composition, a fourth sub-class may have a content of about 7 wt % or less based on a total content of the first class and the second class, with the proviso that a neutral liquid crystal compound of the second class not having the alkenyl group in the terminal groups thereof is a third sub-class and a neutral liquid crystal compound of the second class having the alkenyl group in the terminal groups thereof is the fourth sub-class.

The liquid crystal composition may not contain the fourth sub-class.

The liquid crystal composition may not contain the first sub-class.

The first class may further contain a fluorine-containing liquid crystal compound represented by Formula II, where (n=1, 2, or 3).

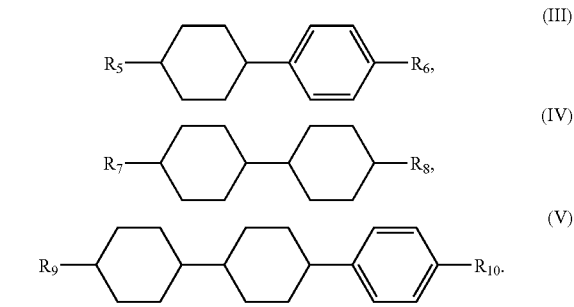

In Formula II, W3, W4, and W5 are each independently selected from —F, —CF3, —CF2H, —OCF3, and —OCF2H, and the liquid crystal compound represented by Formula II has R3 and R4 that are any one of a hydrogen atom, and an alkyl group, an alkoxy group, and an alkenyl group having C1 to C12 as terminal groups.

In the fluorine-containing liquid crystal compound represented by Formula II, a fifth sub-class may have a content of about 8 wt % or less based on a total content of the first class and the second class, with the proviso that the liquid crystal compound having n=1 is the fifth sub-class and the liquid crystal compound having n=2 or 3 is a sixth sub-class.

The liquid crystal composition may not contain the fifth sub-class.

The second sub-class and the sixth sub-class may have a content of about 10 to 25 wt % based on a total content of the liquid crystal composition.

The first class and the second class may have a content of about 20 to 80 wt % based on a total content of the liquid crystal composition.

According to the exemplary embodiment of the present invention, a liquid crystal display includes a first substrate, a second substrate facing the first substrate, a pair of field generating electrodes formed on at least one of the first substrate and the second substrate, and a liquid crystal layer interposed between the first substrate and the second substrate.

The liquid crystal layer has a liquid crystal composition that includes a first class containing a fluorine-containing liquid crystal compound represented by Formula I (n=1, 2, or 3), and a second class containing at least one neutral liquid crystal compound represented by Formulae III, IV, and V:

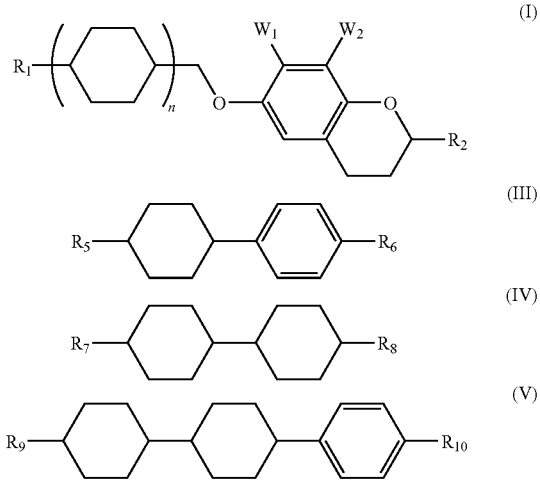

In Formula I, W1 and W2 are each independently selected from —F, —CF3, —CF2H, —OCF3, and —OCF2H, the liquid crystal compounds represented by Formulae I, III, IV, and V have R1, R2, and R5 to R10 that are any one of a hydrogen atom, and an alkyl group, an alkoxy group, and an alkenyl group having C1 to C12 as terminal groups, and a first sub-class has a content of about 6 wt % or less based on a total content of the first class and the second class, with the proviso that a liquid crystal compound of the first class having n=1 is the first sub-class and a liquid crystal compound of the first class having n=2 or 3 is a second sub-class.

The liquid crystal display may further include an inclination direction determination member determining an inclination direction of the liquid crystal compounds of the liquid crystal layer.

The inclination direction determination member may include a cutout formed in a field generating electrode or a protrusion formed on the field generating electrode.

DETAILED DESCRIPTION OF THE EMBODIMENTS

Figure 1:
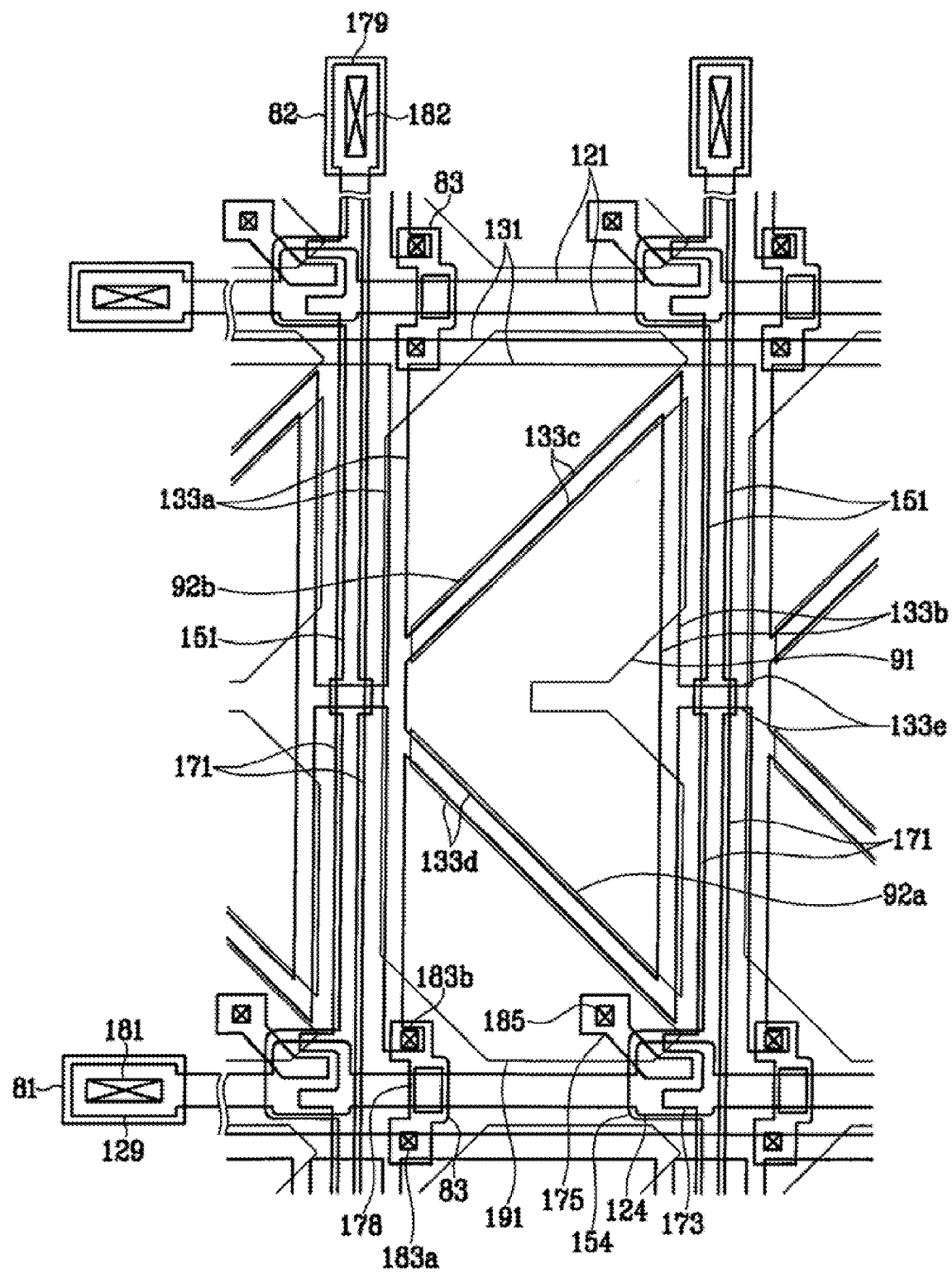
FIG. 1 is a layout view of a thin film transistor array panel for a liquid crystal display according to an exemplary embodiment of the present invention.

Hereinafter, a description will be given of a liquid crystal composition according to an exemplary embodiment of the present invention.

The liquid crystal composition contains various types of liquid crystal compounds having different physical properties.

The liquid crystal has a core group constituting the center, and a terminal group and/or lateral group connected to the core group.

The core group may include cyclic compounds selected from phenyl groups, cyclohexyl groups, and heterocycles.

The terminal group and/or the lateral group may include a non-polar group such as an alkyl group, an alkoxy group, and an alkenyl group, and/or a polar group such as a fluorine atom, and the physical properties of the liquid crystal depend on the terminal group and/or the lateral group.

The liquid crystal composition according to the exemplary embodiment of the present invention contains a fluorine-containing compound having dielectric anisotropy and a neutral compound not having dielectric anisotropy.

The fluorine-containing compound contains the compound shown in Formula I.

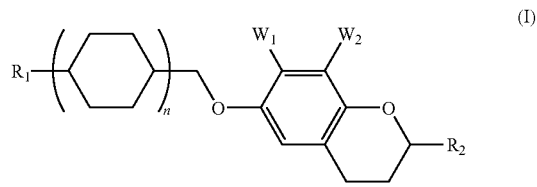

In Formula I, at least one of W1 and W2 may include a fluorine atom, and may be any one selected from —F, —CF3, —CF2H, —OCF3, and —OCF2H. R1 and R2 may be independently a hydrogen atom, or an alkyl group, an alkoxy group, or an alkenyl group having 1 to 12 carbon atoms.

The number of cyclohexyl groups, that is, n, may be 1, 2, or 3. However, it is preferable that the liquid crystal compound not have n=1. If the liquid crystal compound has n=1, it is preferable that the content of the liquid crystal compound having n=1 be about 6 wt % or less based on the total content of the liquid crystal composition.

The liquid crystal compound having n=1 has a connection to the voltage holding ratio (VHR) and a linear residual image, and a description thereof will be given below.

The fluorine-containing compound also contains the compound shown in Formula II.

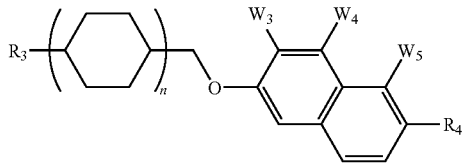

(II)

In Formula II, at least one of W3, W4, and W5 may include a fluorine atom, and may be any one selected from —F, —CF3, —CF2H, —OCF3, and —OCF2H. R3 and R4 may be independently a hydrogen atom, or an alkyl group, an alkoxy group, or an alkenyl group having 1 to 12 carbon atoms.

The number of cyclohexyl groups, that is, n, may be 1, 2, or 3. However, it is preferable that the liquid crystal compound not have n=1. If the liquid crystal compound has n=1, it is preferable that the content of the liquid crystal compound having n=1 be 8 wt % or less based on the total content of the liquid crystal composition.

The liquid crystal compound having n=1 has a connection to the voltage holding ratio (VHR) and a linear residual image, and a description thereof will be given below.

The fluorine-containing compound may have a content of about 20 to 80 wt % based on the total content of the liquid crystal composition.

Among the fluorine-containing compounds, it is preferable that the compound shown in Formula I have a content of about 5 to 40 wt % based on the total content of the liquid crystal composition. Where the content is less than about 5 wt %, the dielectric anisotropy may deteriorate and, where the content is more than about 40 wt %, the phase transition temperature (Tni) may be changed, causing crystallization.

For the compound shown in Formula I, it is preferable that a compound having n=2 or 3 have a content of about 10 to 25 wt % based on the total content of the liquid crystal composition.

It is preferable that the compound shown in Formula II have a content of about 40 wt % or less based on the total content of the liquid crystal composition. Where the content is more than about 40 wt %, the phase transition temperature may be changed, causing crystallization.

As to the compound shown in Formula II, it is preferable that a compound having n=2 or 3 have a content of about 10 to 25 wt % based on the total content of the liquid crystal composition.

The neutral compound may contain one or more selected from Formulae III, IV, and V.

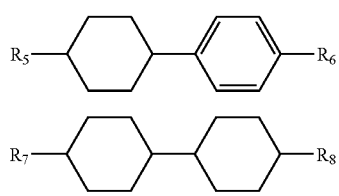

(III)

(IV)

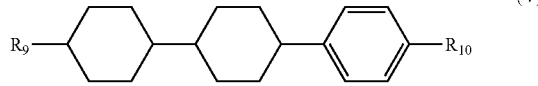

(V)

In the above-mentioned Formulae, R5 to R10 may be the same or different, and may be selected from an alkyl group, an alkoxy group, and an alkenyl group having 1 to 12 carbon atoms.

It is preferable that R5 to R10 do not contain the alkenyl group. In the case where any one of R5 to R10 contains the alkenyl group, it is required that the compound containing the alkenyl group have a content of about 7 wt % or less based on the total content of the liquid crystal composition.

The neutral compound may control the viscosity of the liquid crystal composition, and it is preferable that the neutral compound have a content of about 20 to 80 wt % based on the total content of the liquid crystal composition.

Among the compounds, it is preferable that the liquid crystal compounds shown in Formulae III, IV, and V have respectively a content of about 10 to 45 wt %, about 10 to 45 wt %, and about 0 to 20 wt % based on the total content of the liquid crystal composition.

For a liquid crystal composition according to the exemplary embodiment of the present invention having fluorine-containing liquid crystal compounds, the content of a compound where the number of cyclohexyl groups is one (n=1) is preferred. Among the neutral compounds, the content of a compound having the alkenyl group in a terminal group thereof is preferred in order to increase the voltage holding ratio and to improve the linear residual image.

First, the voltage holding ratio was evaluated.

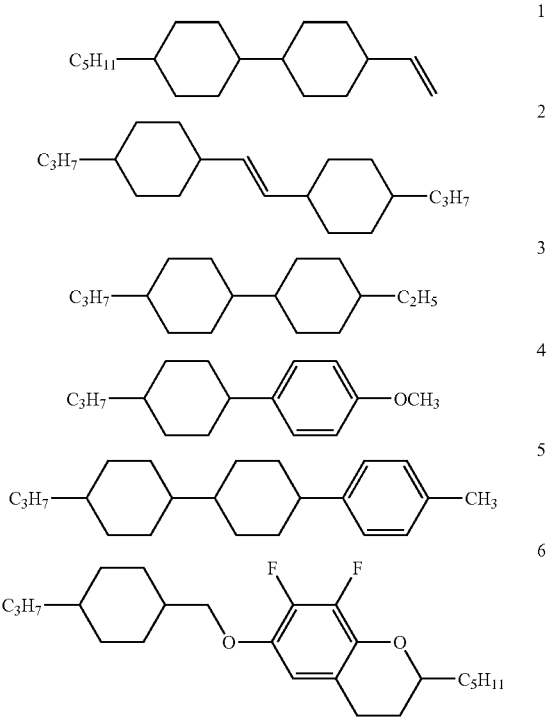

-continued

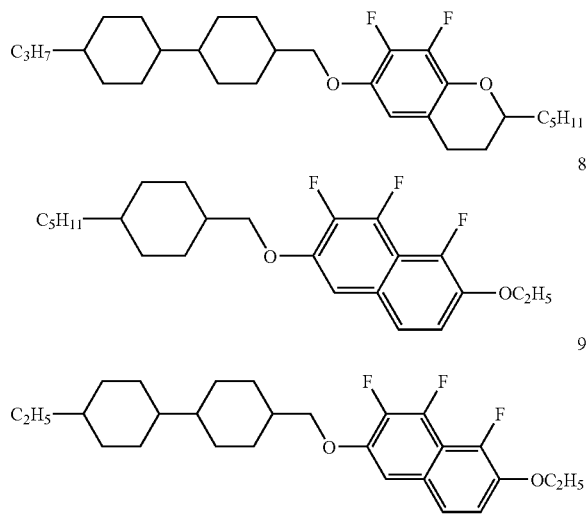

Nine display panels for testing, each including two substrates having field generating electrodes and a liquid crystal layer interposed between the substrates, were prepared. The display panels for testing included different liquid crystal compositions, with About 80 to 90 wt % of the components that constitute the liquid crystal compositions being the same as each other and about 10 to 20 wt % of the components being different.

Figure 6:
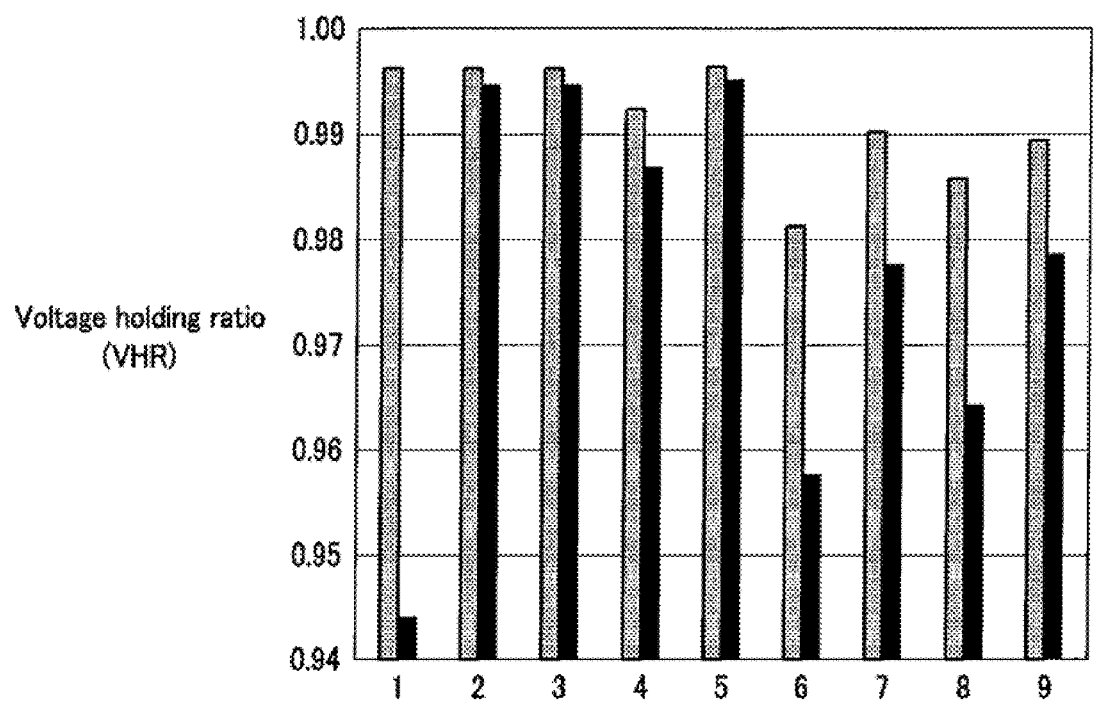
FIG. 6 is a histogram showing voltage holding ratios of the liquid crystal displays that contain the liquid crystal compositions according to an example of the present invention.

Among the nine display panels for testing, display panels 1 to 5 were provided to test the voltage holding ratio in the case where the display panels include a neutral compound having an alkenyl group in the terminal group thereof, and the display panels included about 80 to 90 wt % of common components and the neutral compounds shown in the following Formulae 1 to 5. Among the nine display panels for testing, the display panels 6 to 9 were provided to test the voltage holding ratio according to the number (n) of cyclohexyl groups in the fluorine-containing compound shown in Formula I or II, and the display panels included the common components and the fluorine-containing compounds shown in the following Formulae 6 to 9:

After the display panels for testing were aged at about 120° C. for about 48 hours, the reduction in voltage holding ratio was evaluated. The results will be described with reference to FIG. 6. FIG. 6 is a histogram showing the voltage holding ratios of the liquid crystal displays that include the liquid crystal compositions according to examples of the present invention.

In FIG. 6, the left bars show the voltage holding ratios before aging, and the right bars show the voltage holding ratios after aging.

With reference to FIG. 6, the display panel 1, which included a neutral compound having the alkenyl group in the terminal group thereof, had a voltage holding ratio that was significantly reduced after aging, and the display panels 2, 3, 4, and 5, which included a neutral compound having no alkenyl group in the terminal group thereof, had a voltage holding ratio that was only slightly reduced after aging.

Further, if the display panel 6, where the number of the cyclohexyl group was one (n=1) in the fluorine-containing compound shown in Formula I, is compared to the display panel 7, where the number of cyclohexyl group was two (n=2), it can be seen that a difference in reduction of the voltage holding ratio was significant after aging.

Furthermore, if the display panel 8, where the number of the cyclohexyl group was one (n=1) in the fluorine-containing compound shown in Formula II, is compared to the display panel 9, where the number of cyclohexyl group was two (n=2), it can also be seen that a difference in reduction of the voltage holding ratio was significant after aging.

The content of the fluorine-containing compound that is shown in Formula I or II and in which the number of the cyclohexyl group is one (n=1), and the content of the neutral compound that has the alkenyl group in the terminal group thereof may be specified to prevent the voltage holding ratio from being significantly reduced after the driving.

Next, the linear residual image is evaluated.

A display panel for testing, which includes two substrates having field generating electrodes and a liquid crystal layer interposed between the substrates, was prepared. A plurality of pixels were disposed in the display panel. A black sign was drawn on a portion of the pixels alternately disposed in terms of length and breadth, and a white sign was drawn on the remaining pixels to form a lattice-type black/white pattern.

Next, after a predetermined time, the black/white signs were removed, and the whole display panel was observed while the color of the display panel was changed in the uniform gray range from the black color to the white color to confirm whether linear spots occurred at the boundary of each of the pixels. The time taken for the linear spots to form (hereinafter, referred to as 'linear residual image revelation time') was measured. The linear residual image revelation time is an index that shows how long the liquid crystal display is driven without the linear residual image forming. The longer the linear residual image revelation time is, the better a linear residual image characteristic is.

The present inventor prepared three display panels for testing that included the neutral compound shown in Formula 1 in a content of about 0 wt %, about 7 wt %, and about 45 wt %, respectively, based on the total content of the liquid crystal composition, and evaluated the linear residual image using the above-mentioned process.

As a result, where the display panel did not include the neutral compound having the alkenyl group in the terminal group (0 wt %), the linear residual image was not formed even after about 2400 hours. The linear residual image revelation times of the display panels that included about 7 wt % and about 45 wt % of the neutral compound were about 2000 hours and about 420 hours.

Accordingly, it is confirmed that the presence of the linear residual image significantly depends on the content of the alkenyl group in the terminal group of the neutral compound, and specifically, if a neutral compound having the alkenyl group in the terminal group has a content of about 7 wt % or less, it is possible to ensure a linear residual image time of 2000 hours or more. Further, it can be seen that where a neutral compound does not have the alkenyl group in the terminal group, the maximum linear residual image revelation time is ensured.

Where the neutral compound contains the alkenyl group in the terminal group, the position of the double bond of the alkenyl group may be the reaction site of the ion impurity. Accordingly, the ion impurity may be bonded to the terminal group of the neutral compound to remain even after the liquid crystal composition is produced. The ion impurity is laterally transported along an electric field formed in a liquid crystal layer during the driving of the liquid crystal display to be positioned at a predetermined portion such as a boundary of a field generating electrode. If the ion impurity is bonded to the liquid crystal molecule, the refractive anisotropy is changed, causing a linear residual image.

In addition, the present inventor prepared three display panels for testing that included the fluorine-containing compound shown in Formula 6 in a content of about 0 wt %, about 6 wt %, and about 20 wt %, respectively, based on the total content of the liquid crystal composition, and evaluated the linear residual image using the above-mentioned process.

As a result, a display panel that did not include the fluorine-containing compound shown in Formula 6 (0 wt %), the linear residual image was not formed even after about 2400 hours. The linear residual image revelation times of the display panels that included about 6 wt % and about 20 wt % of the fluorine-containing compounds shown in Formula 6 were about 2000 hours and about 600 hours, respectively.

Likewise, the present inventor prepared three display panels for testing that included the fluorine-containing compound shown in Formula 8 having a content of about 0 wt %, about 8 wt %, and about 20 wt %, respectively, based on the total content of the liquid crystal composition, and evaluated the linear residual image using the above-mentioned process.

As a result, a display panel that did not include the fluorine-containing compound that is shown in Formula 8 (0 wt %), the linear residual image was not formed even after about 2400 hours. The linear residual image revelation times of the display panels that included about 8 wt % and about 20 wt % of fluorine-containing compounds shown in Formula 8 were about 2000 hours and about 600 hours, respectively.

Accordingly, it is confirmed that the presence of the linear residual image significantly depends on the number of cyclohexyl group in the fluorine-containing compound and, specifically, if the compounds shown in Formulae 6 and 8 have a content of 6 wt % or less and 8 wt % or less based on the total content of the liquid crystal composition, it is possible to ensure the linear residual image revelation time of 2000 hours or more. Further, it can be seen that where the compounds shown in Formulae 6 and 8 are not present, the maximum linear residual image revelation time is ensured.

Therefore, in the present invention, the compound that contains one cyclohexyl group of the fluorine-containing compound is preferred, and the neutral compound having the alkenyl group in the terminal group is preferred to reduce the reaction with the ion impurity. Accordingly, a change in refractive anisotropy of the liquid crystal composition resulting from the ion impurity may be reduced to improve a linear residual image characteristic.

It is confirmed that the liquid crystal composition according to the exemplary embodiment of the present invention has high voltage holding ratio and linear residual image revelation time, and also has desirable dielectric anisotropy, refractive anisotropy, and rotational viscosity.

In detail, the liquid crystal composition that has a positive dielectric anisotropy has a dielectric anisotropy ($\Delta\in$) of +3 to +20, a refractive anisotropy ($\Delta$n) of 0.060 to 0.180, and a rotational viscosity of 50 to 250 mPa·s, and the liquid crystal composition that has a negative dielectric anisotropy has a dielectric anisotropy of −3.6 to −2.8, a refractive anisotropy of 0.085 to 0.095, and a rotational viscosity of 21 to 165 mPa·s.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. Now, a detailed description will be given of the liquid crystal display according to the exemplary embodiment of the present invention with reference to FIGS. 1 to 5.

Figure 2:
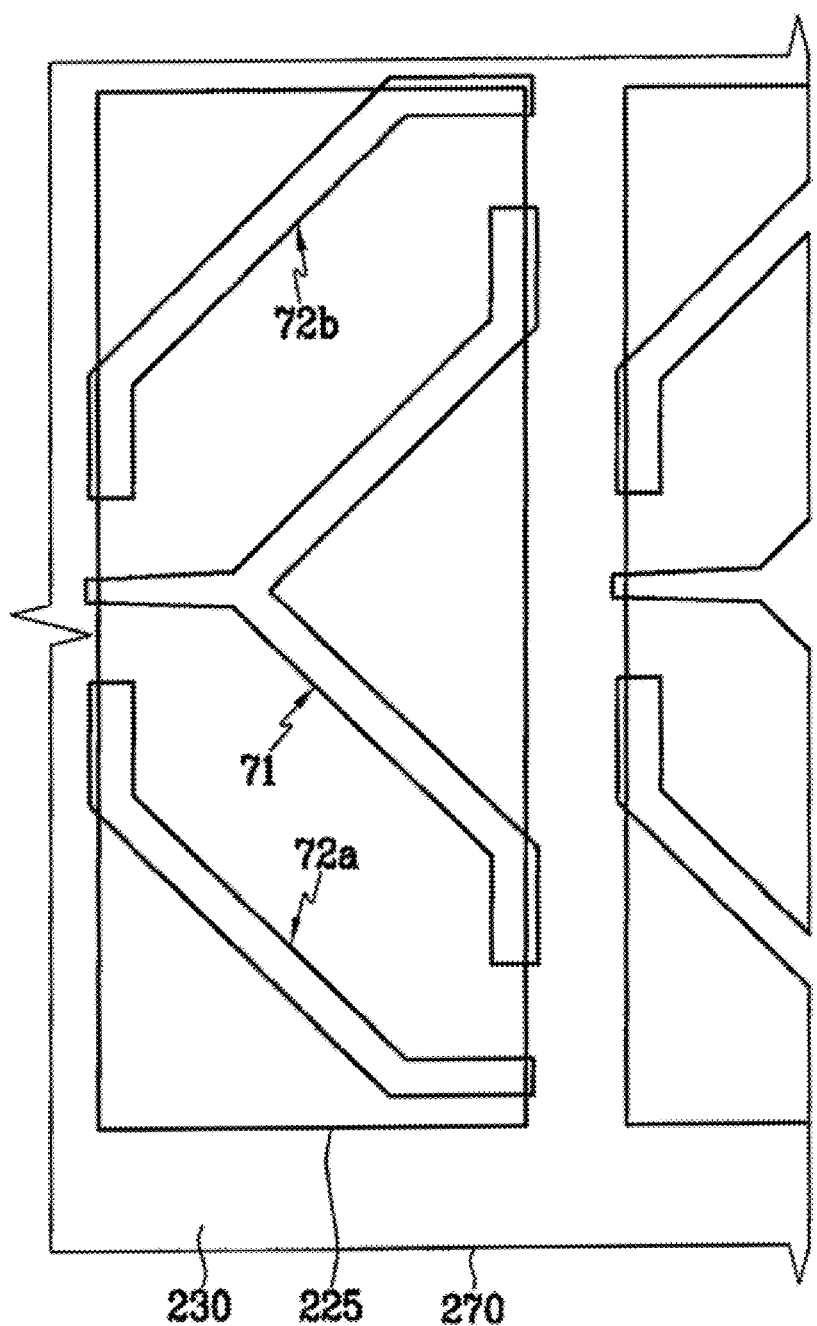
FIG. 2 is a layout view of a common electrode panel for a liquid crystal display according to the exemplary embodiment of the present invention.
Figure 3:
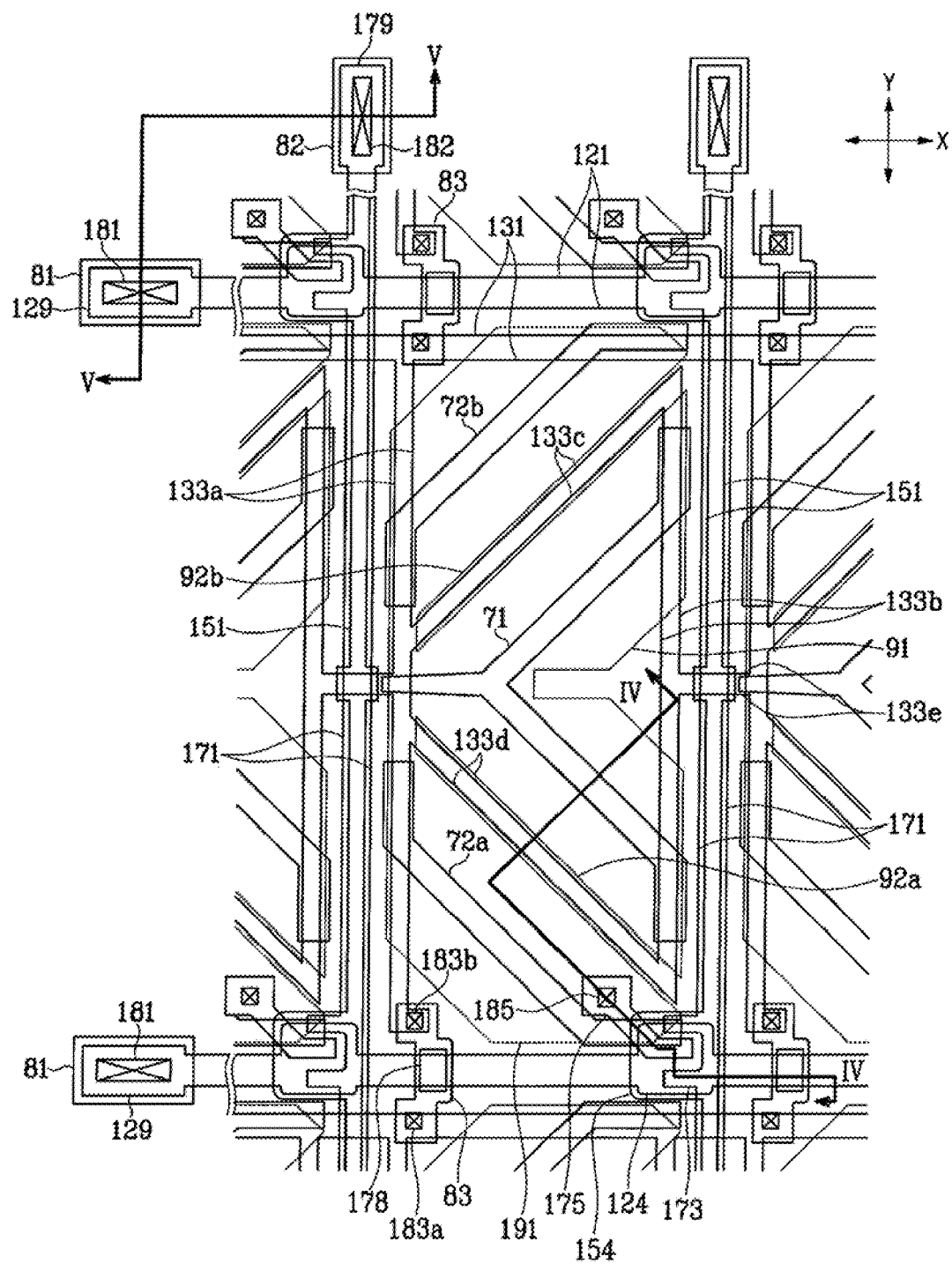
FIG. 3 is a layout view of a liquid crystal display that includes the thin film transistor array panel of FIG. 1 and the common electrode panel of FIG. 2.
Figure 4:
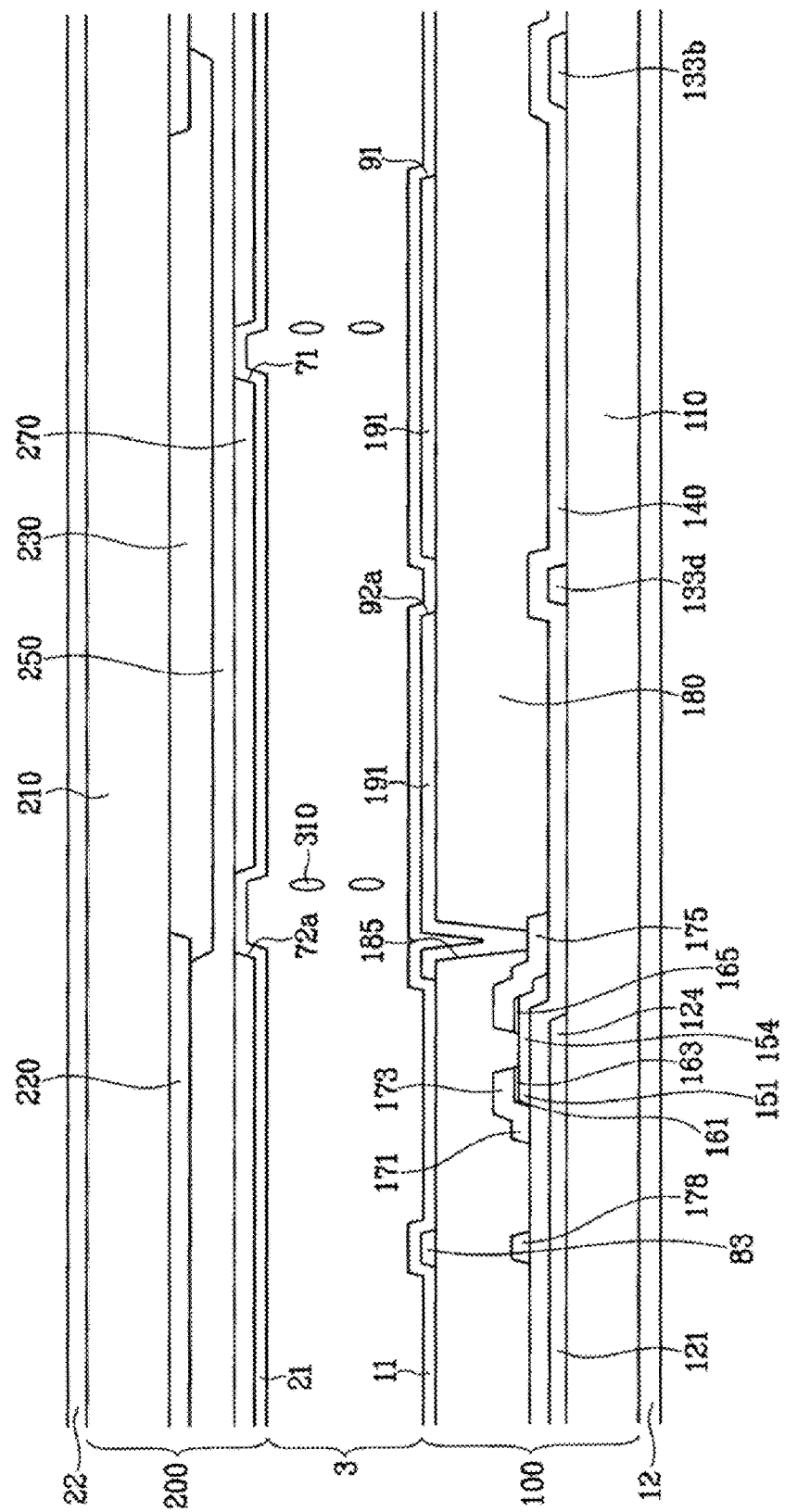
FIGS. 4 and 5 are cross-sectional views of the liquid crystal display of FIG. 3 taken along the lines IV-IV and V-V.
Figure 5:
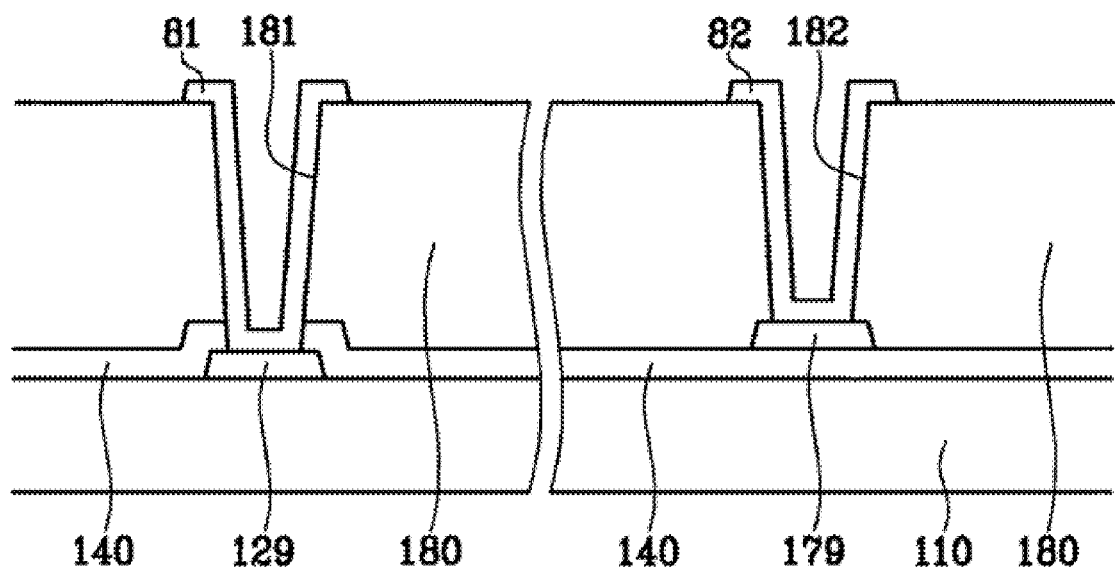

FIG. 1 is a layout view of a thin film transistor array panel for a liquid crystal display according to an exemplary embodiment of the present invention, FIG. 2 is a layout view of a common electrode panel for a liquid crystal display according to the exemplary embodiment of the present invention, FIG. 3 is a layout view of a liquid crystal display that includes the thin film transistor array panel of FIG. 1 and the common electrode panel of FIG. 2, and FIGS. 4 and 5 are cross-sectional views of the liquid crystal display of FIG. 3 taken along the lines IV-IV and V-V.

Referring to FIGS. 1 to 5, the liquid crystal display according to the exemplary embodiment of the present invention includes a thin film transistor array panel 100 and a common electrode display panel 200 that face each other, and a liquid crystal layer 3 interposed between the two panels 100 and 200.

First, the thin film transistor array panel 100 will be described with reference to FIGS. 1, 3, 4, and 5.

A plurality of gate lines 121 and a plurality of storage electrode lines 131 are formed on an insulating substrate 110 made of, for example, transparent glass or plastic.

The gate lines 121 transmit gate signals, and extend in a horizontal direction. Each of the gate lines 121 includes a plurality of gate electrodes 124 protruding upward and an end portion 129 having a large area so as to be connected to another layer or an external driving circuit. A gate driving circuit (not shown) that generates a gate signal may be provided on a flexible printed circuit film (not shown) attached to a substrate 110, directly provided on the substrate 110, or integrated with the substrate 110. In the case where the gate driving circuit is integrated with the substrate 110, the gate line 121 extends and may be directly connected to the gate driving circuit.

A predetermined voltage is applied to the storage electrode lines 131, and each storage electrode line 131 includes a stem line extending almost parallel to the gate lines 121, and a plurality of first, second, third, and fourth storage electrodes 133a, 133b, 133c, and 133d and a plurality of connections 133e branched from the stem line. Each of the storage electrode lines 131 is provided between two adjacent gate lines 121, and the stem line is closer to the upper one of the two adjacent gate lines 121.

The first and second storage electrodes 133a and 133b extend in a vertical direction to face each other. Each first storage electrode 133a has a fixed end that is connected to the branch line and a free end opposite to the fixed end, the free end having a projection. The third and fourth storage electrodes 133c and 133d obliquely extend from the center of the first storage electrode 133a to upper and lower portions of the second storage electrode 133b, respectively. The connections 133e are connected between the adjacent storage electrodes 133a to 133d. However, the shape and arrangement of the storage electrode lines 131 may be modified in various different ways.

The gate lines 121 and the storage electrode lines 131 may be made of a conductor having low resistance, for example, an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), or titanium (Ti). Further, the gate lines 121 and the storage electrode lines 131 may have a multi-layer structure including two conductive layers (not shown) whose physical properties are different from each other.

Sides of the gate lines 121 and the storage electrode lines 131 are inclined with respect to a surface of the substrate 110, and an inclination angle is preferably about 30° to 80°.

On the gate lines 121 and storage electrode lines 131, a gate insulating layer 140 that is made of silicon nitride (SiNx) or silicon oxide ($SiO_2$) is formed.

On the gate insulating layer 140, a plurality of semiconductor stripes 151 that are made of hydrogenated amorphous silicon (abbreviated as hydrogenated a-Si) or polysilicon are formed. The semiconductor stripes 151 extend mainly in a vertical direction and have a plurality of projections 154 that protrude toward the gate electrodes 124.

A plurality of ohmic contact stripes and islands 161 and 165 are formed on the semiconductor stripes 151. The ohmic contacts 161 and 165 may be made of a material such as n+ hydrogenated amorphous silicon that is heavily doped with an n-type impurity such as phosphorous, or silicide. Each of the ohmic contact stripes 161 has a plurality of projections 163, and a pair of a projection 163 and an ohmic contact island 165 is disposed on each projection 154 of the semiconductor stripes 151.

The sides of the semiconductor stripes 151 and the ohmic contacts 161 and 165 are also sloped with respect to the surface of the substrate 110, and the inclination angle is about 30° to 80°.

On the ohmic contacts 161 and 165 and the gate insulating layer 140, a plurality of data lines 171, a plurality of drain electrodes 175, and a plurality of isolated metal pieces 178 are formed. The data lines 171 transfer data signals, and extend mainly in a vertical direction to intersect the gate lines 121, the branch lines of the storage electrode lines 131, and the connections 133e. Each of the data lines 171 has a plurality of source electrodes 173 that extend toward the gate electrodes and wide ends 179 for connection with the other layers or external driving circuits. A data driving circuit (not shown) that generates a data voltage may be provided on a flexible printed circuit film (not shown) that is attached onto the substrate 110, directly provided on the substrate 110, or integrated with the substrate 110. In the case where the data driving circuit is integrated with the substrate 110, the data lines 171 may be directly connected to the circuit.

The drain electrodes 175 are formed to be separated from the data lines 171, and face the source electrodes 173 with the gate electrodes 124 interposed therebetween. Each of the drain electrodes 175 has a wide end and a rod type end that is surrounded by the source electrode 173.

One gate electrode 124, one source electrode 173, and one drain electrode 175 form a single thin film transistor (TFT) along with the projection 154 of the semiconductor stripe 151, and a channel of the thin film transistor is formed in the projection 154 between the source electrode 173 and the drain electrode 175.

The isolated metal pieces 178 are disposed on the gate lines 121 in the vicinity of the first storage electrodes 133a.

The data lines 171, the drain electrodes 175, and the isolated metal pieces 178 may be made of a conductor having low resistance, like the gate lines 121.

Sides of the data lines 171, the drain electrodes 175, and the isolated metal pieces 178 are also inclined with respect to a surface of the substrate 110, and the inclination angle is preferably about 30° to 80°.

The ohmic contacts 161 and 165 are formed only between the semiconductor stripe 151 that is positioned under the ohmic contacts 161 and 165, and the data lines 171 and the drain electrodes 175 that are positioned on the ohmic contacts 161 and 165 to reduce the contact resistance therebetween.

A passivation layer 180 is formed on the data lines 171, the drain electrodes 175, the isolated metal pieces 178, and exposed portions of the semiconductor stripes 151. The passivation layer 180 is made of an inorganic insulator or an organic insulator, and has flat surfaces. Examples of the inorganic insulator include $SiN_x$ and $SiO_2$. The passivation layer 180, however, may have a double-layer structure of an inorganic lower layer and an organic upper layer so as to have the excellent insulating characteristics of the dielectric layer but to not damage the exposed portions of the semiconductor stripes 151.

A plurality of pixel electrodes 191, a plurality of overpasses 83, and a plurality of contact assistants 81 and 82 are formed on the passivation layer 180. The pixel electrodes 191, the overpasses 83, and the contact assistants 81 and 82 may be made of a transparent conductive material such as indium tin oxide (ITO) or indium zinc oxide (IZO) or a reflective metal such as Al, Ag, Cr, or alloys thereof.

The pixel electrodes 191 are physically and electrically connected to the drain electrodes 175 through contact holes 185, and the data voltage is applied from the drain electrodes 175 to the pixel electrodes 191.

The pixel electrodes 191 applied with the data voltage form an electric field along with the common electrode 270 of the other display panel 200 applied with the common voltage to thereby determine the orientation of liquid crystal molecules 310 in the liquid crystal layer 3 interposed between the two electrodes 191 and 270. The polarization of light passing through the liquid crystal layer 3 varies depending on the orientation of the liquid crystal molecules 310 as determined above. The pixel electrodes 191 and the common electrode 270 form capacitors (hereinafter, referred to as 'liquid crystal capacitors') to maintain the applied voltage even after the thin film transistor is turned off.

The pixel electrodes 191 overlap the storage electrode lines 131 including the storage electrodes 133a-133d. The pixel electrodes 191 and the drain electrodes 175 that are electrically connected to the pixel electrodes 191 overlap the storage electrode lines 131 to form capacitors. These capacitors are referred to as "storage capacitors". The storage capacitors improve the voltage maintaining property of the liquid crystal capacitors.

Each of the pixel electrodes 191 has four main sides that are almost parallel to the gate lines 121 or the data lines 171, and the four corners thereof are chamfered. Thus, the pixel electrodes are almost rectangular. The angle of the chamfered sides of the pixel electrodes 191 is about 45° with respect to the gate lines 121. Each pixel electrode 191 has a center cutout 91, a lower cutout 92a, and an upper cutout 92b, and so is divided into a plurality of partitions by the cutouts 91 to 92b. The cutouts 91 to 92b are almost inversion-symmetrical to an imaginary horizontal center line that divides the pixel electrode 191 into two portions.

The lower and upper cutouts 92a and 92b obliquely extend between the left and right sides of the pixel electrode 191 and overlap the third and the fourth storage electrodes 133c and 133d. The lower and upper cutouts 92a and 92b are positioned in lower and upper portions of the horizontal center line of the pixel electrode 191, respectively. The lower and upper cutouts 92*a* and 92*b* are perpendicular to each other and are formed at about 45° with respect to the gate lines 121.

The center cutout 91 extends along the horizontal center line of the pixel electrode 191 and has an opening formed on the right side thereof. The opening of the center cutout 91 has a pair of oblique sides that are almost parallel to the lower cutout 92*a* and the upper cutout 92*b*. The center cutout 91 has horizontal portions and a pair of oblique lines connected to the horizontal portions. The horizontal portions extend shortly along the horizontal center line of the pixel electrode 191 and the pair of oblique lines extend from the horizontal portions to the right side of the pixel electrode 191, almost parallel to the lower cutout 92*a* and the upper cutout 92*b*.

Accordingly, the lower portion of the pixel electrode 191 is divided into two regions by the lower cutout 92*a*, and the upper portion thereof is divided into two regions by the upper cutout 92*b*. In this case, the number of the regions or cutouts may vary depending on design components, such as the size of the pixel electrode 191, the length ratio of the horizontal side and the vertical side of the pixel electrode 191, the type of liquid crystal layer 3, or characteristics.

The overpasses 83 intersect the gate lines 121 and are connected to the exposed portions of the storage electrodes 131 and the exposed ends of the free ends of the first storage electrodes 133 through contact holes 183*a* and 183*b* that are opposite to each other with the gate lines 121 therebetween. The storage electrodes 133*a* and 133*b*, the storage electrode lines 131, and the overpasses 83 may be used to repair the defects of the gate lines 121, the data lines 171, or the thin film transistors.

The contact assistants 81 and 82 are connected to the ends 129 of the gate lines 121 and the ends 179 of the data lines 171 through contact holes 181 and 182, respectively. The contact assistants 81 and 82 complement the attachment of the ends 129 of the gate lines 121 and the ends 179 of the data lines 171 to external devices, and also protect them.

Next, with reference to FIGS. 2 to 4, the common electrode panel 200 will be described.

A light blocking member 220 is formed on an insulating substrate 210 made of a transparent glass or plastic. The light blocking member 220 is referred to as a black matrix and prevents the light leakage between the pixel electrodes 191. The light blocking member 220 faces the pixel electrodes 191 and has a plurality of openings 225 that have almost the same shape as the pixel electrodes 191. The light blocking member 220, however, may have portions corresponding to the gate lines 121 and the data lines 171, and portions corresponding to the thin film transistors.

Further, a plurality of color filters 230 are formed on the substrate 210. Most of the color filters 230 are disposed in a region surrounded by the light blocking member 220, and may extend along a row of the pixel electrodes 191 in a vertical direction. Each of the color filters 230 can display one of three primary colors such as red, green, and blue.

An overcoat 250 is formed on the color filters 230 and the light blocking member 220. The overcoat 250 may be made of an (organic) insulating member, prevents the color filters 230 from being exposed to the outside, and provides a flat surface. The overcoat 250 may be omitted.

A common electrode 270 is formed on the overcoat 250. The common electrode 270 is made of a transparent conductor such as ITO or IZO, and a plurality of cutouts 71, 72*a*, 72*b* are formed on the common electrode 270.

A group of cutouts 71 to 72*b* faces one of the pixel electrodes 191 and includes a center cutout 71, a lower cutout 72*a*, and an upper cutout 72*b*. Each of the cutouts 71 to 72*b* is disposed between adjacent cutouts 91 to 92*b* of the pixel electrodes 191 or between cutouts 92*a* and 92*b* and chamfered sides of the pixel electrodes 191. Further, each of the cutouts 71 to 72*b* has at least one oblique side that extends almost parallel to a lower cutout 92*a* or an upper cutout 92*b* of the pixel electrodes 191. The cutouts 71 to 72*b* are almost inversion-symmetrical to the horizontal center line of the pixel electrodes 191.

The lower and upper cutouts 72*a* and 72*b* each have oblique lines, horizontal portions, and vertical portions. The oblique lines extend substantially from upper sides or lower sides of the pixel electrodes 191 to left sides of the pixel electrodes 191. The horizontal portions and the vertical portions extend along the sides of the pixel electrodes 191 from ends of the oblique lines to overlap the sides of the pixel electrodes 191 and are formed at an obtuse angle with the oblique lines.

Each center cutout 71 has a center horizontal portion, a pair of oblique lines, and a pair of longitudinal vertical portions. Each center horizontal portion extends substantially along the horizontal center line of the pixel electrode 191 from the left side of the pixel electrode 191 to the right side thereof. The pair of oblique lines are formed at an obtuse angle with the center horizontal portion from an end of the center horizontal portion to the right side of the pixel electrode 191, and extend almost parallel to the lower and upper cutouts 72*a* and 72*b*, respectively. The longitudinal vertical portions extend along the right sides of the pixel electrodes 191 from the ends of the corresponding oblique lines to overlap the right sides and are formed at an obtuse angle with the oblique lines.

The number of cutouts 71 to 72*b* may vary depending on the design components. The light blocking member 220 may overlap the cutouts 71 to 72*b* to prevent light leakage around the cutouts 71 to 72*b*.

When a common voltage is applied to the common electrode 270 and a data voltage is applied to the pixel electrodes 191, an electric field that is almost perpendicular to the surfaces of the display panels 100 and 200 is generated. In response to the electric field, the orientation of the liquid crystal molecules 310 is changed such that the longitudinal axes of the liquid crystal molecules 310 are perpendicular to the direction of the electric field.

The cutouts 71 to 72*b* and 91 to 92*b* of the field generating electrodes 191 and 270 and the sides of the pixel electrodes 191 generate a horizontal component that determines the inclination direction of the liquid crystal molecules 310 by transforming the electric field. The horizontal component of the electric field is almost perpendicular to the sides of the cutouts 71 to 72*b* and 91 to 92*b* and the sides of the pixel electrodes 191.

Referring to FIG. 3, one group of cutouts 71 to 72*b* and 91 to 92*b* divides one pixel electrode 191 into a plurality of sub-areas, each respective sub-area having two primary edges that are formed at an oblique angle with a primary edge of the pixel electrode 191. The primary edges of the sub-areas and polarization axes of polarizers 12 and 22 are formed at about 45°, which maximizes optical efficiency.

Since most of the liquid crystal molecules 310 in the sub-areas are formed to be perpendicular to the primary edges, there are four inclination directions. Accordingly, due to the various orientations of the liquid crystal molecules 310, the reference viewing angle of the liquid crystal display increases.

The shape and arrangement of the cutouts 71 to 72*b* and 91 to 92*b* may be modified in various different ways.

At least one of the cutouts 71 to 72*b* and 91 to 92*b* may be replaced with a protrusion (not shown) or a depression (not shown). The protrusion may be made of an organic material or an inorganic material, and may be disposed on or under the field generating electrodes 191 and 270.

Alignment layers 11 and 21 are applied on inner surfaces of the display panels 100 and 200, and may be a homeotropic alignment layer.

The polarizers 12 and 22 are disposed on outer surfaces of the display panels 100 and 200, and polarization axes (X, Y) of the two polarizers 12 and 22 are perpendicular to each other and formed at about 45° with respect to the oblique cutouts 92a and 92b and the oblique lines of the cutouts 71 to 72b.

For a liquid crystal composition according to the exemplary embodiment of the present invention having fluorine-containing liquid crystal compounds, the content of a compound where the number of cyclohexyl groups is one (n=1) is preferred. Among the neutral compounds, the content of a compound having the alkenyl group in a terminal group thereof is preferred in order to increase the voltage holding ratio and to improve the linear residual image. For a reflective liquid crystal display, either one of the two polarizers 12 and 22 may be omitted.

The liquid crystal display according to an exemplary embodiment of the present invention may further include a retardation film (not shown) for compensating the retardation of the liquid crystal layer 3. The liquid crystal display may further include a lighting unit (backlight unit) (not shown) that emits light to the polarizers 12 and 22, the retardation film, the display panels 100 and 200, and the liquid crystal layer 3.

The liquid crystal layer 3 has a negative dielectric anisotropy, and is oriented such that the longitudinal axes of the liquid crystal molecules 310 of the liquid crystal layer 3 are almost perpendicular to the surfaces of the two display panels 100 and 200 when applying no electric field. Accordingly, the incident light does not pass through the crossed polarizers 12 and 22 and is blocked.

The liquid crystal layer 3 includes the liquid crystal composition that contains a plurality of liquid crystal compounds. Since the liquid crystal composition has already been described, the description thereof will be omitted.

In the present exemplary embodiment, only the vertically aligned (VA) mode of a liquid crystal display is described. However, it will be easily understood by those skilled in the art that the present invention can be applied to a horizontally oriented mode of a liquid crystal display, such as twisted nematic (TN) or in-plane switching (IPS).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal composition comprising:
 a first class comprising at least one compound selected from the group consisting of a fluorine-containing liquid crystal compound represented by Formula I, where (n=1, 2, or 3), and a fluorine-containing liquid crystal compound represented by Formula II, where (n=1, 2, or 3),

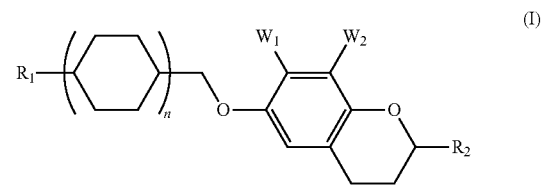

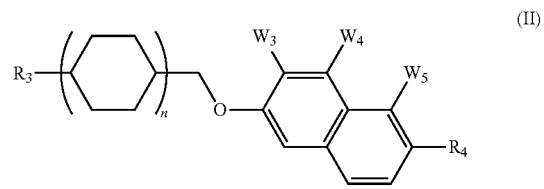

and a second class comprising at least one neutral liquid crystal compound represented by Formulae III, IV, and V:

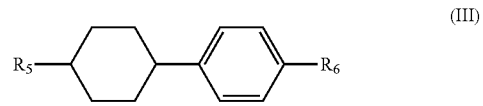

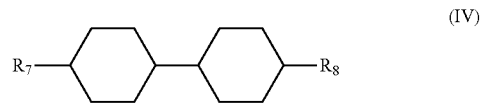

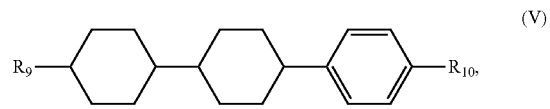

wherein $W_1$, $W_2$, $W_3$, $W_4$, and $W_5$ are independently one selected from the group consisting of —F, —$CF_3$, —$CF_2H$, —$OCF_3$, and —$OCF_2H$, the liquid crystal compounds represented by Formulae I, II, III, IV, and V have $R_1$ to $R_{10}$ that are any one of a hydrogen atom, and an alkyl group, an alkoxy group, and an alkenyl group having C1 to C12 as terminal groups, a fifth sub-class or sixth sub-class, the fifth sub-class having n=1 and a content of about 8 wt % or less based on the total content of the first class and the second class, and the sixth sub-class having n=2 or 3, and a third sub-class or a fourth sub-class, the fourth sub-class having the alkenyl group in the terminal groups of the second class and having a content of about 7 wt % or less based on the total content of the liquid crystal composition, and the third sub-class not having the alkenyl group in the terminal groups of the second class.

2. The liquid crystal composition of claim 1, comprising no fourth sub-class.

3. The liquid crystal composition of claim 1, comprising no fifth sub-class.

4. The liquid crystal composition of claim 1, wherein the fluorine-containing liquid crystal compound represented by Formula I includes a first sub-class or a second subclass, the first sub-class having n=1 and a content of about 6 wt % or less based on the total content of the first class and the second class, the second sub-class having n =2 or 3.

5. The liquid crystal composition of claim 4, comprising no first sub-class.

6. The liquid crystal composition of claim 4, wherein the second sub-class and the sixth sub-class have a content of about 10 to 25 wt % based on the total content of the liquid crystal composition.

7. The liquid crystal composition of claim 4, wherein the total amount of the first sub-class and the fifth sub-class is about 8% or less.

8. The liquid crystal composition of claim 1, wherein the first class and the second class have a content of about 20 to 80 wt % based on the total content of the liquid crystal composition, respectively.

9. A liquid crystal display comprising:
a first substrate;
a second substrate facing the first substrate;
a pair of field generating electrodes disposed on at least one of the first substrate and the second substrate; and
a liquid crystal layer interposed between the first substrate and the second substrate,
wherein the liquid crystal layer has a liquid crystal composition, the liquid crystal composition including
a first class comprising at least one compound selected from the group consisting of a fluorine-containing liquid crystal compound represented by Formula I, where (n=1, 2, or 3), and a fluorine-containing liquid crystal compound represented by Formula II, where (n=1, 2, or 3),

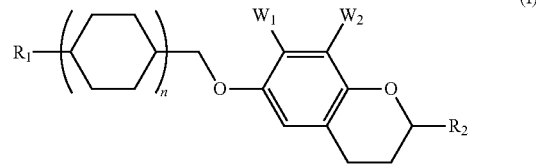

(I)

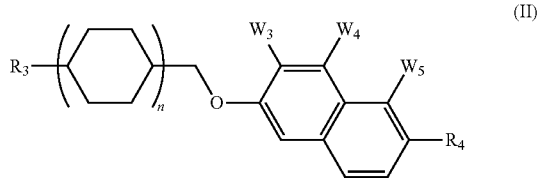

(II)

and a second class comprising at least one neutral liquid crystal compound represented by Formulae III, IV, and V,

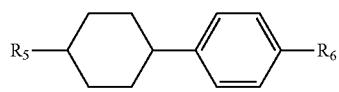

(III)

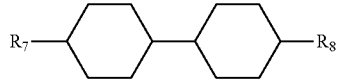

(IV)

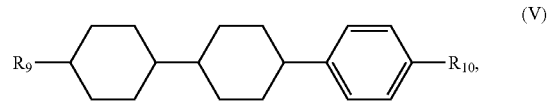

(V)

wherein $W_1$, $W_2$, $W_3$, $W_4$, and $W_5$ are independently one selected from the group consisting of —F, —$CF_3$, —$CF_2H$, —$OCF_3$, and —$CF_2H$,
the liquid crystal compounds represented by Formulae I, II, III, IV, and V have $R_1$ to $R_{10}$ that are any one of a hydrogen atom, and an alkyl group, an alkoxy group, and an alkenyl group having C1 to C12 as terminal groups,
a fifth sub-class or sixth sub-class, the fifth sub-class having n =1 and a content of about 8 wt % or less based on the total content of the first class and the second class, and the sixth sub-class having n=2 or 3, and
a third sub-class or a fourth sub-class, the fourth sub-class having the alkenyl group in the terminal groups of the second class and having a content of about 7 wt % or less based on the total content of the liquid crystal composition, and the third sub-class not having the alkenyl group in the terminal groups of the second class.

10. The liquid crystal composition of claim 9, comprising no fourth sub-class.

11. The liquid crystal composition of claim 9, comprising no fifth sub-class.

12. The liquid crystal composition of claim 9, wherein the fluorine-containing liquid crystal compound represented by Formula I includes a first sub-class or a second subclass, the first sub-class having n=1 and a content of about 6 wt % or less based on the total content of the first class and the second class, the second sub-class having n =2 or 3.

13. The liquid crystal composition of claim 12, comprising no first sub-class.

14. The liquid crystal composition of claim 12, wherein the second sub-class and the sixth sub-class have a content of about 10 to 25 wt % based on the total content of the liquid crystal composition.

15. The liquid crystal display of claim 12, wherein the total amount of the first sub-class and the fifth sub-class is about 8% or less.

16. The liquid crystal composition of claim 9, wherein the first class and the second class have a content of about 20 to 80 wt % based on the total content of the liquid crystal composition, respectively.

17. The liquid crystal display of claim 9, further comprising:
an inclination direction determination member determining an inclination direction of the liquid crystal compound in the liquid crystal layer.

18. The liquid crystal display of claim 16, wherein the inclination direction determination member includes a cutout formed in a field generating electrode or a protrusion formed on the field generating electrode.